United States Patent
Lidoine

(10) Patent No.: US 7,963,362 B2
(45) Date of Patent: Jun. 21, 2011

(54) ACOUSTIC PANEL HAVING A VARIABLE ACOUSTIC CHARACTERISTIC

(75) Inventor: Stephane Lidoine, Cugnaux (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/598,364

(22) PCT Filed: Apr. 24, 2008

(86) PCT No.: PCT/FR2008/050746
§ 371 (c)(1),
(2), (4) Date: Oct. 30, 2009

(87) PCT Pub. No.: WO2008/152259
PCT Pub. Date: Dec. 18, 2008

(65) Prior Publication Data
US 2010/0133378 A1 Jun. 3, 2010

(30) Foreign Application Priority Data
Apr. 30, 2007 (FR) ...................... 07 54783

(51) Int. Cl.
*B64D 33/02* (2006.01)
*B64D 33/04* (2006.01)
*E04B 1/82* (2006.01)
*E04B 1/84* (2006.01)
*B64D 33/00* (2006.01)
*E04B 1/74* (2006.01)

(52) U.S. Cl. .................. 181/214; 181/292; 244/53 B

(58) Field of Classification Search .................. 181/214, 181/292, 288, 286; 244/1 N, 53 B
See application file for complete search history.

(56) References Cited

U.S. PATENT DOCUMENTS

| | | | | |
|---|---|---|---|---|
| 4,091,892 A * | 5/1978 | Hehmann et al. | ............ | 181/286 |
| 4,137,992 A * | 2/1979 | Herman | ........................ | 181/213 |
| 4,244,439 A * | 1/1981 | Wested | ........................ | 181/210 |
| 4,291,080 A * | 9/1981 | Ely et al. | ........................ | 428/116 |
| 4,410,065 A | 10/1983 | Harvey | | |

(Continued)

FOREIGN PATENT DOCUMENTS
FR  2 317 504  2/1977

(Continued)

OTHER PUBLICATIONS

International Search Report dated Dec. 17, 2008, from corresponding PCT application.

*Primary Examiner* — Edgardo San Martin
(74) *Attorney, Agent, or Firm* — Young & Thompson

(57) ABSTRACT

An acoustic panel includes a reflective layer, at least one alveolar structure, and an acoustically resistive structure forming an aerodynamic surface of an aircraft on the surface of which at least one acoustic wave propagates along an axis of propagation (24), whereby at least one of the characteristics of the acoustic panel influences the impedance of the panel that varies along the axis of propagation of the at least one acoustic wave, characterized in that it includes at least one first zone A with a constant acoustic impedance that is juxtaposed along the axis of propagation of the at least one acoustic wave at a zone C at which at least one characteristic of the acoustic panel that influences the impedance gradually varies along the axis of propagation of the at least one acoustic wave, whereby the characteristic has a value without sudden variations from one zone to the next.

4 Claims, 2 Drawing Sheets

U.S. PATENT DOCUMENTS

| | | | | |
|---|---|---|---|---|
| 5,175,401 A * | 12/1992 | Arcas et al. | ............... | 181/292 |
| 5,912,442 A * | 6/1999 | Nye et al. | ............... | 181/292 |
| 5,952,621 A * | 9/1999 | Curtis et al. | ............... | 181/213 |
| 5,979,595 A * | 11/1999 | Harris | ............... | 181/214 |
| 6,609,592 B2 * | 8/2003 | Wilson | ............... | 181/292 |
| 6,615,950 B2 * | 9/2003 | Porte et al. | ............... | 181/292 |
| 6,811,372 B1 * | 11/2004 | Emborg et al. | ............... | 415/119 |
| 7,267,297 B2 * | 9/2007 | Campbell et al. | ............... | 244/1 N |
| 7,540,354 B2 * | 6/2009 | Morin et al. | ............... | 181/292 |
| 2003/0021976 A1 | 1/2003 | Dublineau et al. | | |
| 2003/0141144 A1 * | 7/2003 | Wilson | ............... | 181/292 |
| 2006/0169532 A1 * | 8/2006 | Patrick | ............... | 181/210 |
| 2006/0169533 A1 * | 8/2006 | Patrick | ............... | 181/210 |
| 2008/0083497 A1 | 4/2008 | Dublineau et al. | | |

FOREIGN PATENT DOCUMENTS

| | | |
|---|---|---|
| FR | 2 482 663 | 11/1981 |
| FR | 2 826 168 | 12/2002 |
| GB | 1 490 923 | 11/1977 |

* cited by examiner

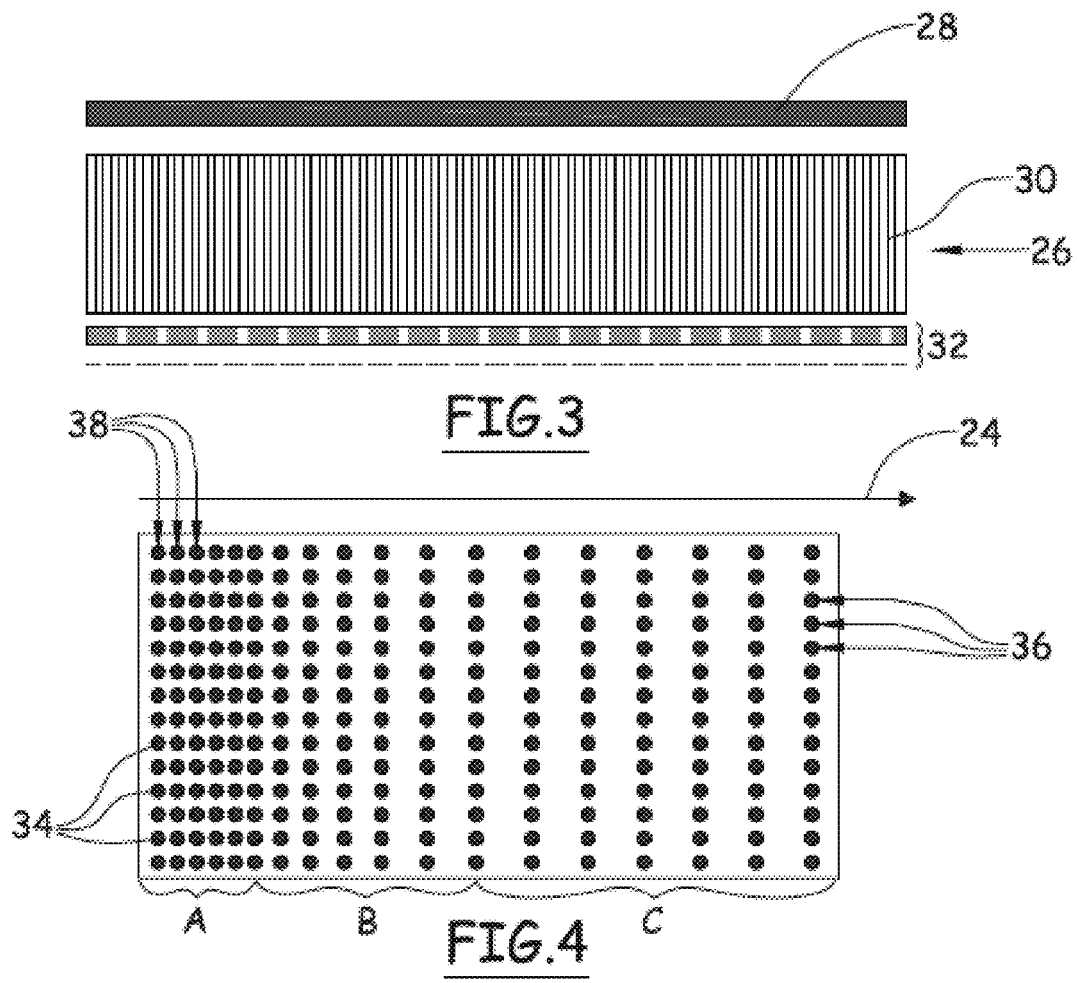
FIG.3
FIG.4
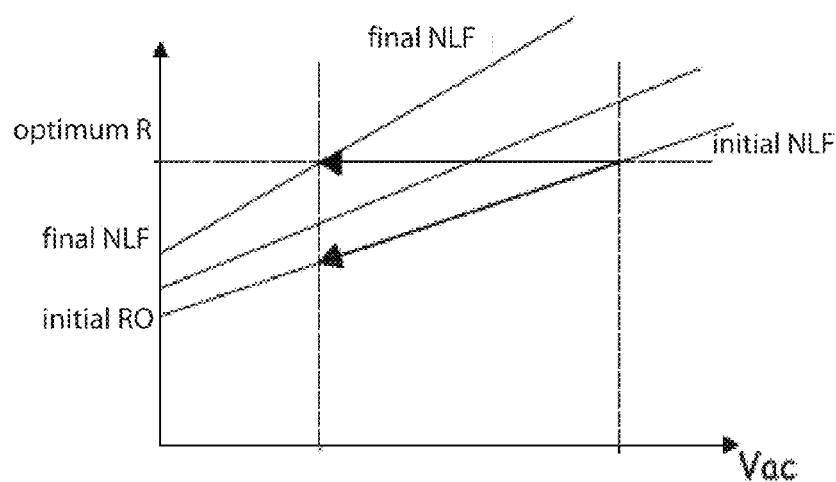
FIG.5

ACOUSTIC PANEL HAVING A VARIABLE ACOUSTIC CHARACTERISTIC

CROSS-REFERENCE TO RELATED APPLICATIONS

The present application claims benefit of priority to and incorporates by reference, PCT/FR2008/050746 filed Apr. 24, 2008 and French Application No. 0754783 filed Apr. 30, 2007.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

This invention relates to an acoustic panel that has at least one variable acoustic characteristic.

2. Description of Related Art

To limit the impact of sound pollution in the vicinity of airports, the international standards are increasingly restrictive as far as sound emissions are concerned.

Techniques have been developed to reduce the noise emitted by an aircraft, and in particular the noise emitted by an aircraft propulsion system, by using—at certain walls—coatings whose purpose is to absorb a portion of the sound energy, in particular by using the principle of Helmholtz resonators.

In a known way, this acoustic coating, also called an acoustic panel, comprises—from the outside to the inside—an acoustically resistive structure, an alveolar structure, and a reflective layer. Structure or layer is defined as one or more layers that may or may not be of the same type.

The acoustically resistive structure is a porous structure that plays a dissipative role, partially transforming the acoustic energy of the sound wave that passes through it into heat. It comprises so—called open zones that are able to allow acoustic waves to pass and other so—called closed or filled zones that do not allow the sound waves to pass but are designed to ensure the mechanical strength of said layer. This acoustically resistive layer is characterized primarily by an open surface ratio that is also called TSO.

In the case of a more complex acoustically resistive layer, for example the ones that comprise a metal material or carbon strips or more generally roughness at the surface in contact with the aerodynamic flows, other acoustic characteristics of the acoustically resistive layer can be adjusted, in particular its resistance to the flow at zero speed, also called RO, its non-linearity factor that is also called NLF.

One example of an acoustic panel is described in particular in the patent application FR-2,826,168 in the name of the applicant.

The acoustic panels are elements with localized reaction that can be characterized by their normal wall impedance. This impedance depends on numerous characteristics, in particular those of the acoustic panel, for example the height of the cavities of the alveolar structure, or more particularly the acoustically resistive structure (primarily TSO, RO, NLF). This impedance also depends on the characteristics that are linked to the air flow that flows at the surface of the panel and other characteristics that are linked to sound, in particular the frequency of the acoustic wave and its amplitude.

According to one application, an acoustic panel can be used to cover certain walls of a propulsion system, in particular those of a nacelle in which a power plant is placed in an essentially concentric manner.

The nacelle comprises an inside wall that delimits a duct with an air intake at the front, a first portion of the incoming air flow, called primary flow, passing through the power plant to participate in the combustion, whereby the second portion of air flow, called secondary flow, is conveyed by a fan and flows in an annular duct that is delimited by the inside wall of the nacelle and the outside wall of the power plant, whereby the different ducts have the same longitudinal axes.

To minimize the noise emitted by a propulsion system, the inside wall of the nacelle is coated by an acoustic panel that extends from the air intake to the rear of the secondary duct. The acoustic panel is generally made in several, preferably contiguous parts.

For a given nacelle and power plant, the characteristics of the acoustic panel and more particularly those of the acoustically resistive structure, in particular TSO, RO, and NLF, are determined so as to obtain an optimum impedance at the frequencies and engine speeds of interest so as to reduce as much as possible the noise that is emitted by the propulsion system in question.

Thus, for a propulsion system, i.e., for a given nacelle and power plant, the characteristics of the acoustic panel and more particularly those of the acoustically resistive structure, in particular TSO, RO, and NLF, are constant over the circumference and in the longitudinal direction of the nacelle.

This solution is not satisfactory because it does not make it possible to optimize the minimization of the noise along the duct of said nacelle.

Also, the purpose of this invention is to remedy the drawbacks of the prior art by proposing an acoustic panel that makes it possible to optimize the minimization of the noise throughout the propagation of the acoustic wave.

BRIEF SUMMARY OF THE INVENTION

For this purpose, the invention has as its object an acoustic panel that comprises a reflective layer, at least one alveolar structure and an acoustically resistive structure that forms an aerodynamic surface of an aircraft on the surface of which at least one acoustic wave propagates along an axis of propagation, whereby at least one of the characteristics of the acoustic panel influences the impedance of said panel that varies along the axis of propagation of said at least one acoustic wave, characterized in that it comprises at least one first zone A with a constant acoustic impedance that is juxtaposed along the axis of propagation of said at least one acoustic wave at a zone C at which at least one characteristic of the acoustic panel that influences the impedance gradually varies along the axis of propagation of said at least one acoustic wave, whereby said characteristic has a value without sudden variations from one zone to the next.

BRIEF DESCRIPTION OF THE SEVERAL VIEWS OF THE DRAWINGS

Other characteristics and advantages will emerge from the following description of the invention, a description that is provided only by way of example, taking into account the accompanying drawings in which:

FIG. 3 is a cross-section of an acoustic attenuation panel,

FIG. 4 is a top view that illustrates the variation of the opening surface ratio of an acoustically resistive structure according to the invention, and FIG. 5 is a diagram that illustrates the variations of the flow resistance at zero speed, RO, and the non-linearity factor, NLF, of an acoustically resistive structure according to the invention.

DETAILED DESCRIPTION OF THE INVENTION

This invention is now described applied to a propulsion system of an aircraft. However, it may be applied to different zones of an aircraft at which an acoustic treatment is carried out, for example the leading edge of the wings or any other location that is close to the engine or close to the engine blades.

Figure 1:
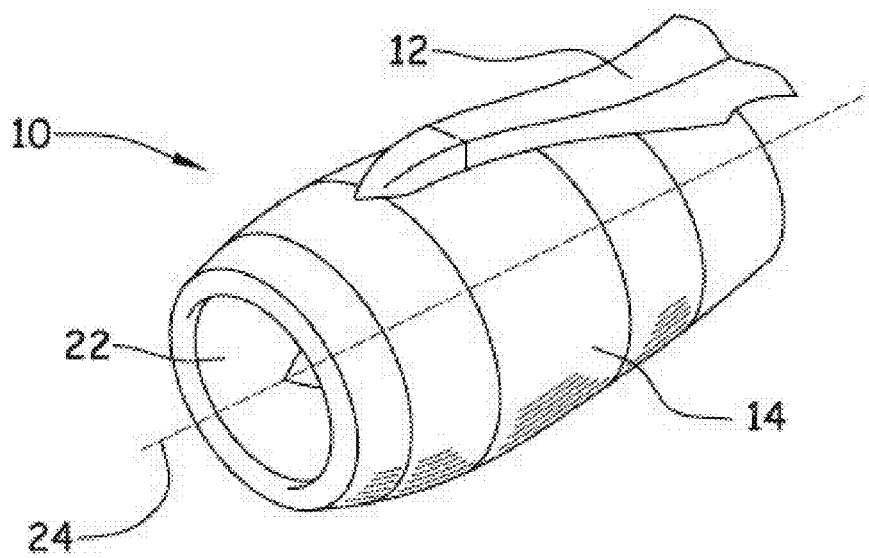
FIG. 1 is a perspective view of a propulsion system of an aircraft.
Figure 2:
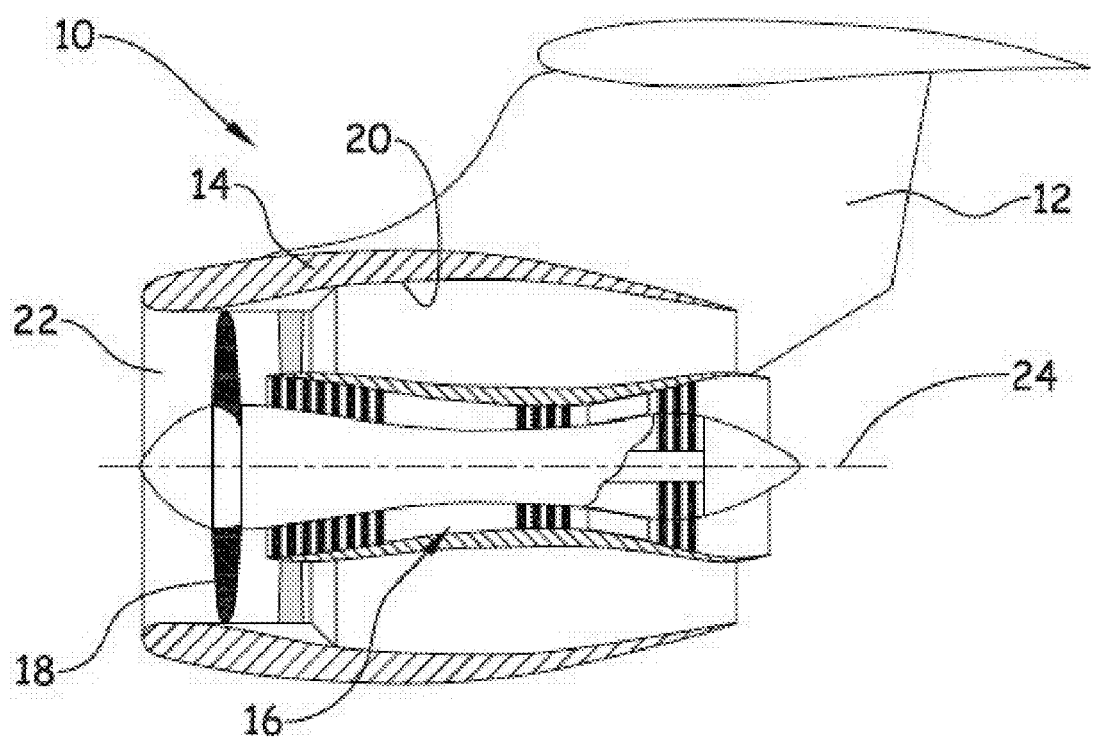
FIG. 2 is a cutaway view of a propulsion system of an aircraft.

In FIG. 1, a propulsion system 10 of an aircraft that is connected under the wing by means of a mast 12 is shown. However, this propulsion system could be connected to other zones of the aircraft.

This propulsion system comprises a nacelle 14 in which a power plant 16 that drives a fan 18 is placed essentially concentrically.

The nacelle 14 comprises an inside wall 20 that delimits a duct with an air intake 22 at the front, a first portion of the incoming air flow, called primary flow, passing through the power plant to participate in the combustion, whereby the second portion of the air flow, called secondary flow, is conveyed by the fan and flows into an annular duct that is delimited by the inside wall 20 of the nacelle and the outside wall of the power plant, whereby the different ducts have the same longitudinal axis 24.

Hereinafter, aerodynamic surface is defined as the shell of the aircraft that is in contact with the aerodynamic flow.

To limit the impact of the noise, a coating 26 whose purpose is to absorb a portion of the sound energy, in particular by using the principle of Helmholtz resonators, is provided in particular at aerodynamic surfaces. In a known manner, this acoustic coating, also called an acoustic panel, comprises—from the inside to the outside—a reflective layer 28, at least one alveolar structure 30, and an acoustically resistive structure 32, as illustrated in FIG. 3.

As a variant, the acoustic coating 26 could comprise several alveolar structures that are separated by acoustically resistive structures called septa.

The acoustic coating can extend over the inside wall 20 of the nacelle, preferably from the front, and cover the leading edge or rim of the air intake of the nacelle, up to the rear outlet of the nacelle.

According to one embodiment, the reflective layer 28 can come in the form of sheet metal or a skin that consists of at least one layer of woven or non-woven fibers embedded in a resin matrix.

The alveolar structure 30 can come in the form of a honeycomb that is made of metal or a composite material, for example a honeycomb structure that is marketed under the name Nida Nomex. As a variant, the alveolar structure could be obtained by other means, for example by the assembly of strips that are interlaced so as to delimit open cells at each of their ends.

The reflective layer 28 and the alveolar structure 30 are not presented in more detail because they are known to one skilled in the art.

The acoustically resistive structure 32 is a porous structure that has a dissipative role, partially transforming the acoustic energy of the sound wave that passes through it into heat. It comprises so-called open zones that are able to allow acoustic waves to pass and other so-called closed or filled zones that do not allow the sound waves to pass but are designed to ensure the mechanical strength of said layer. This acoustically resistive layer 32 is characterized primarily by an open surface ratio that is also called TSO.

In the case of a more complex acoustically resistive layer 32, for example the ones that comprise a metal material or carbon strips or more generally roughness at the aerodynamic surface, other acoustic characteristics of the acoustically resistive layer can be adjusted, in particular its resistance to the flow at zero speed, also called RO, its non-linearity factor that is also called NLF.

According to one embodiment, the acoustically resistive structure 32 can come in the form of at least one woven or non-woven fiber layer, whereby the fibers are preferably coated with a resin to ensure the absorption of stresses in the directions of the fibers.

According to another embodiment, the acoustically resistive structure 32 comprises at least one porous layer in the form of, for example, a material that may or may not be metal, such as a wire mesh, and at least one structural layer, for example, sheet metal or a composite with oblong holes or microperforations.

Generally, the inside wall 20 of the nacelle is covered by several contiguous acoustic panels. Hereinafter, an acoustic panel is defined as one or more contiguous acoustic panels.

The invention is not, however, limited to the embodiments that are described, whereby other solutions can be considered to produce an acoustically resistive structure.

From a functional standpoint, with regard to acoustic waves, an acoustic panel has a localized reaction that can be characterized by its normal wall impedance. This impedance is based on certain characteristics of the acoustic panel, in particular TSO, RO, NLF and the height of the alveolar structure, certain characteristics of the aerodynamic flow, in particular the speed of the flow, and certain characteristics of the acoustic wave, in particular its frequency and its amplitude.

In a known manner, the characteristics of the acoustic panel or the panel portion are determined so as to reach the optimum impedance at the frequencies and engine speeds of interest so as to reduce as much as possible the noise that is emitted by the propulsion system.

In the case of a nacelle, the acoustic waves propagate along the longitudinal axis 24, more generally in a preferred direction that corresponds to the direction of flow of the air streams. Hereinafter, an acoustic wave is defined as one or, more generally, several acoustic waves.

During the propagation of said acoustic waves in the ducts, in particular in the secondary duct, the aerodynamic conditions of the flow grazing the acoustically resistive structure and the amplitude of the acoustic wave vary along the longitudinal axis 24 of the nacelle in particular due to the absorption of the acoustic energy by the acoustic coating. According to the invention, at least one of the characteristics of the acoustic panel that influences the impedance varies along the axis of propagation of the acoustic waves, more specifically along the longitudinal axis 24 of the nacelle so as to locally oppose the variations of the impedance due to the evolution of the characteristics that are linked to the aerodynamic flow and/or to the acoustic wave.

Thus, along the axis of propagation of the acoustic wave, the characteristics of the acoustic panel that influence the impedance evolve so as to preserve an optimum local impedance, and more particularly the actual portion of the impedance that corresponds to the resistance, which makes it possible to obtain the maximum minimization.

According to another characteristic of the invention, at least one characteristic of the acoustic panel that influences the impedance varies continuously, without sudden variations along the axis of propagation of the acoustic waves. Actually, the applicant noted that the sudden variations of impedance generate diffraction and/or can contort the modal structure that makes acoustic treatment less effective.

According to another characteristic of the invention, at least one characteristic and preferably all of the characteristics of the acoustic panel that influence impedance are essentially constant in a plane that is perpendicular to the axis of propagation. In the case of a nacelle, the characteristics of the acoustic panel that influence the impedance for all of the points that are located in the same plane that is perpendicular to the longitudinal axis are constant so as not to break the revolution symmetry.

According to one embodiment, at least one characteristic of the acoustic panel that influences the impedance can be constant in a zone A, for example the air intake of the nacelle, and can have a value V1, be constant in a zone C, for example, the rear part of the nacelle, and have a value V2 and vary within a zone B that separates the zones A and C passing continuously from the value V1 to the value V2.

According to a first embodiment, the acoustic panel comprises an open surface ratio TSO that varies continuously along the longitudinal axis 24. By way of example, as illustrated in FIG. 4, the openings are obtained by openings 34 that are arranged along the first lines 36 that are essentially parallel to the longitudinal axis 24. So as not to break the symmetry of revolution, the openings 34 are also arranged along the second lines 38 that are essentially perpendicular to the longitudinal axis 24. The continuous variation of the TSO is carried out by removing or by gradually shortening the distance between the second lines 38. As a variant, a constant spacing could be preserved between the second lines 38, and the diameter of the holes could be increased gradually second line by second line.

Thus, as illustrated in FIG. 4, the value of the TSO can be constant and equal to TSO1 over a zone A, in particular at the level of the air intake, can also be constant and equal to TSO2 over a zone C, in particular at the rear of the nacelle, and vary continuously and gradually in an intermediate zone B from the value TSO1 up to the value TSO2.

According to another embodiment, the acoustic panel comprises an RO that varies continuously along the axis of propagation of the wave. Actually, to the extent that the amplitude and the speed of the wave decreases, it is possible to compensate for these variations by gradually increasing RO along the axis of propagation of the wave that corresponds to the longitudinal axis 24 of the nacelle. Preferably, when the selection of varying the resistance to the flow at zero speed, RO, is made to compensate for the variations of the impedance because of the evolution of the characteristics linked to the aerodynamic flow and/or the acoustic wave, the non-linearity factor NLF of the acoustic panel gradually varies simultaneously along the axis of propagation of the wave, namely the longitudinal axis 24 in the case of a nacelle, to take into account the variations of NLF that are induced by the variations of RO, as illustrated in FIG. 5.

Conversely, the acoustic panel can comprise an NLF that varies continuously along the axis of propagation of the wave. In this case, the resistance to the flow at zero speed, RO, gradually varies simultaneously along the axis of propagation of the wave, namely the longitudinal axis 24 in the case of a nacelle for taking into account the RO variations induced by the NLF variations.

The invention claimed is:

1. An aircraft nacelle that comprises:
   a duct that extends from an air intake to a rear outlet, said duct being coated by an acoustic panel that comprises a reflective layer (28);
   at least one alveolar structure (30); and
   an acoustically resistive structure (32) that forms an aerodynamic surface of said duct on the surface of which at least on, acoustic wave propagates along an axis of propagation (24),
   wherein at least one of the characteristics of the acoustic panel influences the impedance of said panel that varies along the axis of propagation (24) of said at least one acoustic wave, and
   wherein at least one of the characteristics of the acoustic panel influencing the impedance is constant in a zone A disposed at the level of the air intake and has a value V1, is constant in a zone C disposed at the level of the outlet and has a value V2 and varies within a zone B that separates the zones A and C passing continuously from the value V1 to the value V2.

2. The aircraft nacelle according to claim 1, wherein all of the characteristics of the acoustic panel that influence the impedance are essentially constant in a plane that is perpendicular to the axis of propagation (24).

3. The aircraft nacelle according to claim 1, wherein the characteristic of the acoustic panel that varies is the open surface ratio.

4. The aircraft nacelle according to claim 1, wherein the panel comprises two characteristics that vary simultaneously: the resistance to a flow at zero speed RO and a non-linearity factor NLF.

* * * * *